(12) United States Patent
Perner

(10) Patent No.: US 9,861,839 B2
(45) Date of Patent: Jan. 9, 2018

(54) CONNECTOR

(71) Applicant: D B Industries, LLC, Red Wing, MN (US)

(72) Inventor: Judd J. Perner, Red Wing, MN (US)

(73) Assignee: D B Industries, LLC, Red Wing, MN (US)

( * ) Notice: Subject to any disclaimer, the term of this patent is extended or adjusted under 35 U.S.C. 154(b) by 345 days.

(21) Appl. No.: 14/621,623

(22) Filed: Feb. 13, 2015

(65) Prior Publication Data

US 2015/0231423 A1 Aug. 20, 2015

Related U.S. Application Data

(60) Provisional application No. 61/941,826, filed on Feb. 19, 2014.

(51) Int. Cl.
*F16B 45/02* (2006.01)
*A62B 35/00* (2006.01)

(52) U.S. Cl.
CPC ...... *A62B 35/0037* (2013.01); *A62B 35/0075* (2013.01); *F16B 45/02* (2013.01); *Y10T 24/44427* (2015.01); *Y10T 24/44538* (2015.01); *Y10T 24/44564* (2015.01)

(58) Field of Classification Search
CPC ........ F16B 45/00; F16B 45/025; F16B 45/04; F16B 45/06; F16B 45/02; Y10T 24/44427; Y10T 24/44564; Y10T 24/44538; Y10T 24/45115; Y10T 24/4512; Y10T 24/45126; Y10T 24/45131
See application file for complete search history.

(56) References Cited

U.S. PATENT DOCUMENTS

| | | |
|---|---|---|
| 5,517,735 A | 5/1996 | Tsai |
| 5,799,753 A | 9/1998 | Peltier |
| 6,464,289 B2 | 10/2002 | Sigonneau et al. |
| 6,938,306 B2 | 9/2005 | Joubert et al. |

(Continued)

FOREIGN PATENT DOCUMENTS

| | | |
|---|---|---|
| DE | 201 08 512 | 12/2001 |
| DE | 203 06 385 | 7/2003 |

(Continued)

OTHER PUBLICATIONS

International Search Report issued in PCT/US2015/016272, dated Jun. 29, 2015, 5 pages.

(Continued)

*Primary Examiner* — Jack W Lavinder
(74) *Attorney, Agent, or Firm* — Dicke Billig & Czaja, PLLC

(57) ABSTRACT

A connector includes a body and a gate. The body has a mid portion positioned between a nose portion and a connecting portion. The nose portion terminates in a nose end. The body also has an opening positioned between the nose end and the connecting portion. The mid portion has a flexible strength member extending therethrough interconnecting the nose portion and the connecting portion. The gate has a first end coupled proximate the connection portion of the body and a second end configured and arranged to engage the nose portion of the body to selectively close the opening. The gate has a closed position when positioned across the opening and an open position when the opening is at least partially unobstructed by the gate.

18 Claims, 13 Drawing Sheets

(56) References Cited

U.S. PATENT DOCUMENTS

| | | |
|---|---|---|
| 6,955,393 B2 | 10/2005 | Staargaard et al. |
| 8,752,254 B2 | 6/2014 | Perner |
| 2011/0100766 A1 | 5/2011 | Auston et al. |
| 2011/0240403 A1 | 10/2011 | Meillet |
| 2012/0104187 A1 | 5/2012 | Kramer |

FOREIGN PATENT DOCUMENTS

| | | |
|---|---|---|
| DE | 102 08 200 | 9/2003 |
| DE | 102 24 642 | 12/2003 |
| DE | 20 2007 014 474 | 3/2009 |
| DE | 10 2009 023 937 | 12/2010 |
| DE | 20 2010 010 248 | 9/2011 |
| FR | 2 984 430 | 6/2013 |
| GB | 627111 | 7/1949 |
| GB | 1 267 890 | 3/1972 |
| GB | 2 058 901 | 4/1981 |
| GB | 2 192 926 | 1/1988 |
| GB | 2 370 803 | 7/2002 |
| TW | 200846560 A | 12/2008 |
| WO | WO 01/30647 | 5/2001 |
| WO | WO2003081059 A1 | 10/2003 |
| WO | WO2013130697 A1 | 9/2013 |

OTHER PUBLICATIONS

Graham, Keith Andrew, "Design and Manufacture of a Fibre Reinforced Composite Safety Snap-Hook," Queen's University, Sep. 2007, 175 pages.

"Better Bait, Mechanical Engineers Reinforce Flimsy Fishing Lures," Science Daily, Jul. 1, 2008, 3 pages.

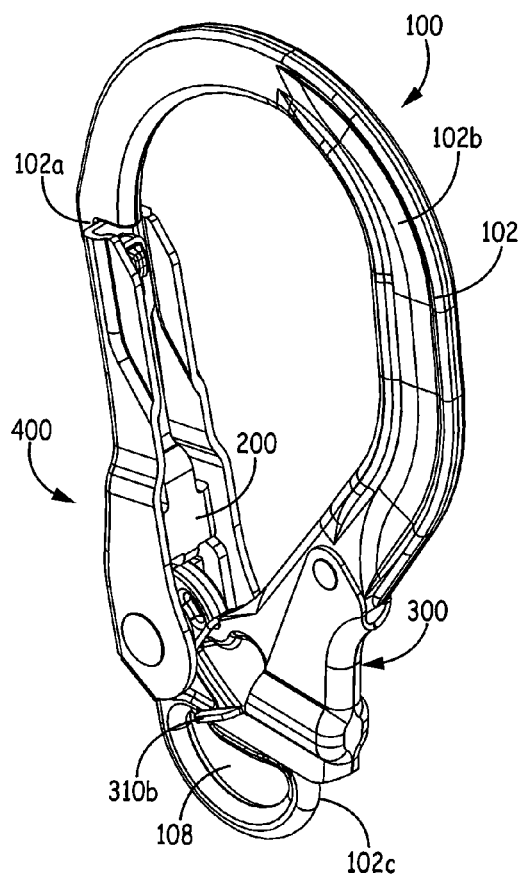
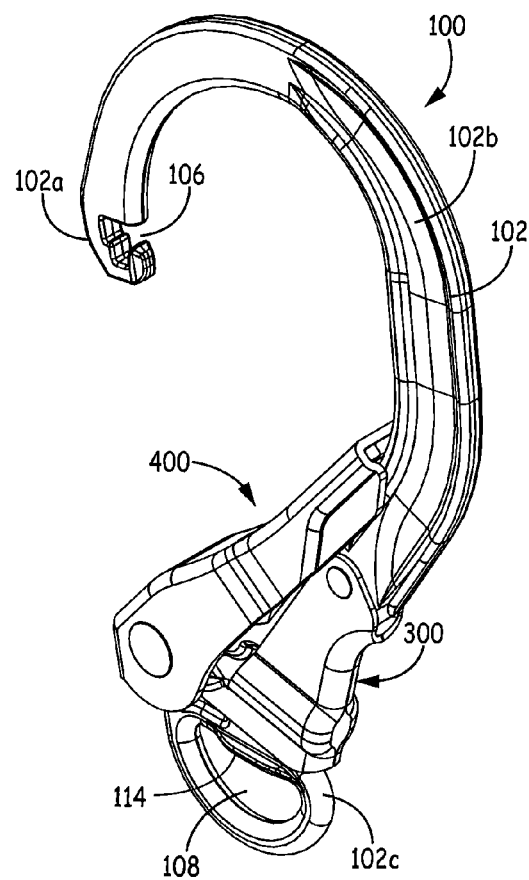
FIG. 1A
PRIOR ART
FIG. 1B
PRIOR ART

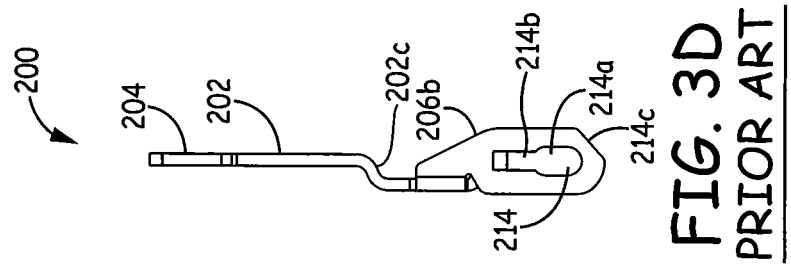
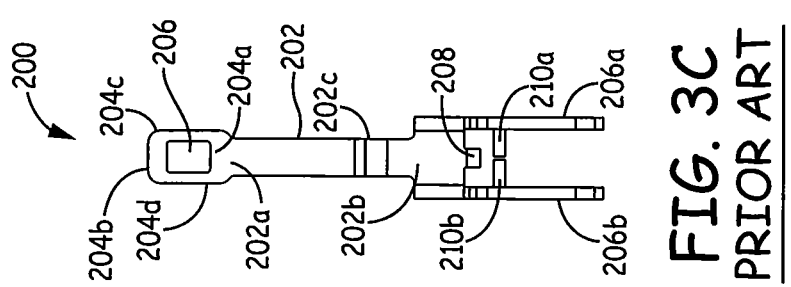
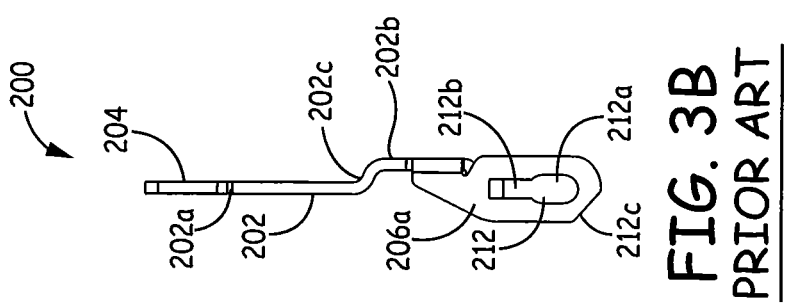
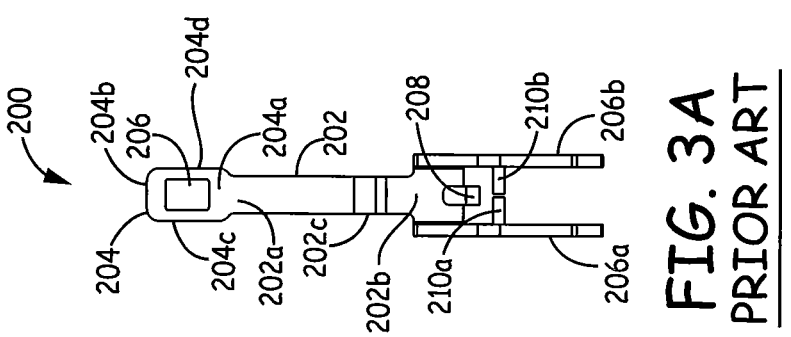

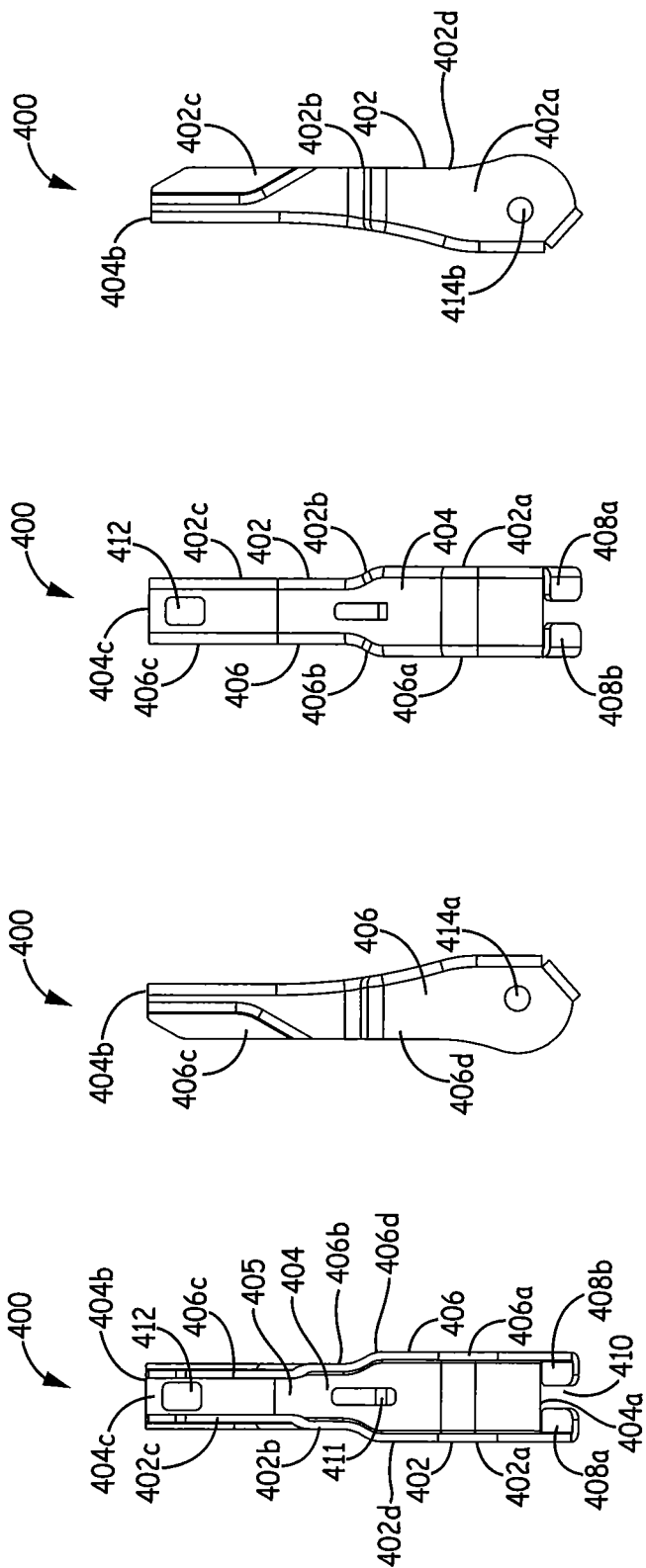

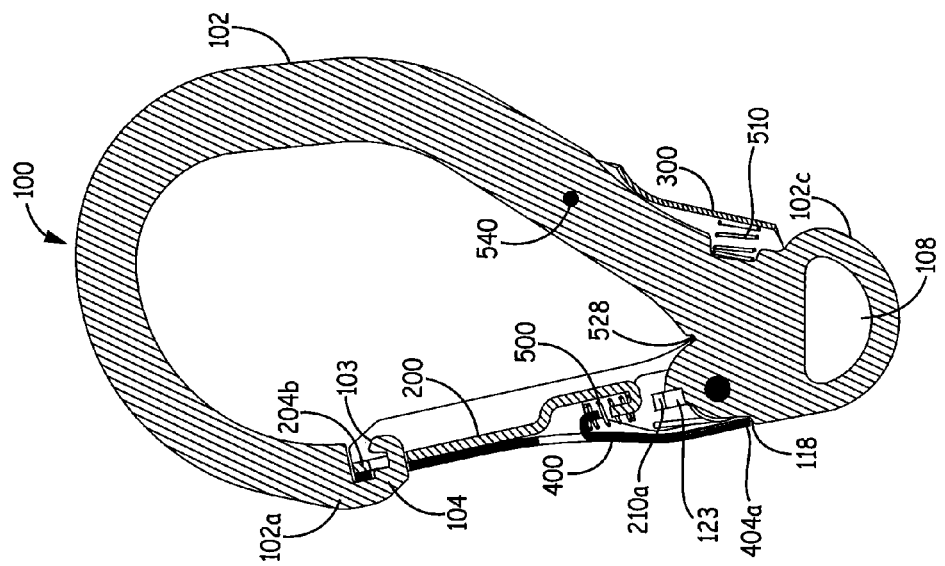
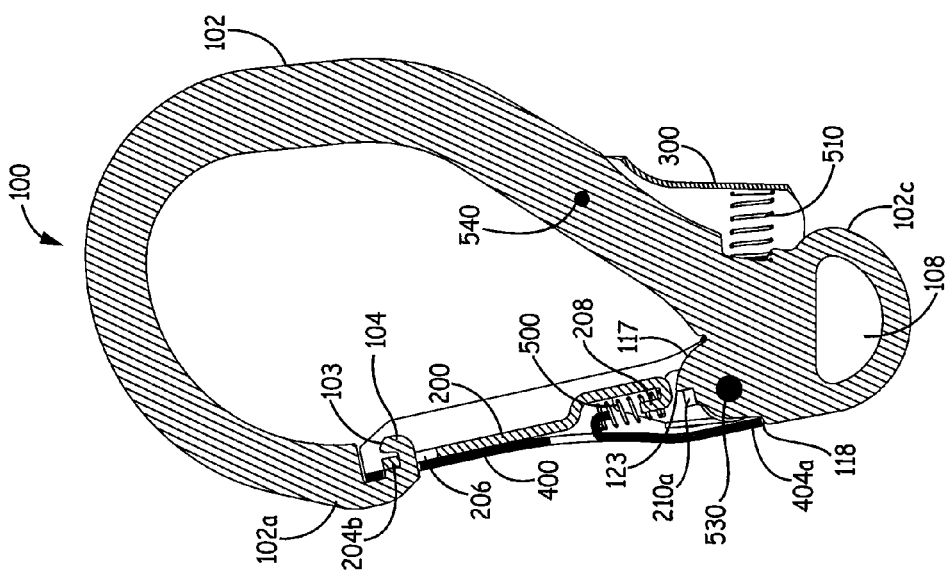
FIG. 7A PRIOR ART
FIG. 7B PRIOR ART

CONNECTOR

This application claims the benefit of U.S. Provisional Application No. 61/941,826, filed Feb. 19, 2014, which is incorporated by reference herein.

BACKGROUND

Connectors are commonly used in the fall protection industry to connect a safety line to a support structure or to a harness donned by a person. Examples of connectors include snap hooks and carabiners. It is important that the gate portion of the connector does not unintentionally open during use or a serious injury or death could occur. Typically, a closed looped end of a snap hook is secured to a safety line and a hook end is secured to the support structure or the harness. A safety line may include a snap hook at each end, one being connected to a support structure and the other being connected to a harness.

Connectors are typically made of a rigid steel or aluminum body that acts as a strength member and a frame or body to which other components of the connector are connected. These connectors are susceptible to fracture when exposed to high flexural loads during fall arrest situations. This effect is amplified as the body size increases.

Therefore, there is a need for a large connector capable of withstanding large transverse body loads and plastic deformations without separating from a support structure.

For the reasons stated above and for other reasons stated below which will become apparent to those skilled in the art upon reading and understanding the present specification, there is a need in the art for a connector with an effective and efficient gate locking mechanism.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a connector includes a body and a gate. The body has a mid portion positioned between a nose portion and a connecting portion. The nose portion terminates in a nose end. The body also has an opening positioned between the nose end and the connecting portion. The mid portion has a flexible strength member extending therethrough interconnecting the nose portion and the connecting portion. The gate has a first end coupled proximate the connection portion of the body and a second end configured and arranged to engage the nose portion of the body to selectively close the opening. The gate has a closed position when positioned across the opening and an open position when the opening is at least partially unobstructed by the gate.

In another embodiment, a connector comprises a body, a gate, and a locking member. The body has a mid portion positioned between a nose portion and a connecting portion. The nose portion terminates in a nose end. The body further has an opening positioned between the nose end and the connecting portion. The mid portion has a flexible strength member extending therethrough interconnecting the nose portion and the connecting portion. The gate has a first end coupled proximate the connecting portion of the body and a second end configured and arranged to engage the nose portion of the body to selectively close the opening. The gate has a closed position when positioned across the opening and an open position when the opening is at least partially unobstructed by the gate. The locking member interconnects the nose portion and the second end of the gate to form a locked, closed loop arrangement with the nose portion, the flexible strength member, and the connecting portion.

In another embodiment, the mid portion is configured and arranged to deform when subjected to a force.

In another embodiment, the second end of the gate is configured and arranged to be selectively locked relative to the nose portion thereby forming a locked, closed loop arrangement with the nose portion, the flexible strength member, and the connecting portion.

In another embodiment, the flexible strength member includes a first stop pivotally connected to the nose portion, a second stop pivotally connected to the connecting portion, and an elongate member interconnecting the first and second stops and extending through the mid portion.

BRIEF DESCRIPTION OF THE DRAWINGS

The present invention can be more easily understood and further advantages and uses thereof will be more readily apparent, when considered in view of the detailed description and the following figures in which:

FIG. 1A is a side perspective view of a prior art snap hook that could be used with an embodiment of the present invention having its gate positioned in a closed configuration;

FIG. 1B is a side perspective view of the snap hook of FIG. 1A having its gate positioned in an opened configuration;

FIG. 3A is a front view of a locking member of the snap hook of FIG. 1A;

FIG. 3B is a first side view of the locking member of FIG. 3A;

FIG. 3C is a back view of the locking member of FIG. 3A;

FIG. 3D is a second side view of the locking member of FIG. 3A;

FIG. 5A is a back view of a gate of the snap hook of FIG. 1A;

FIG. 5B is a side view of the gate of FIG. 5A;

FIG. 5C is a front view of the gate of FIG. 5A;

FIG. 5D is a second side view of the gate of FIG. 5A;

FIG. 7A is a cross-sectional side view of the snap hook of FIG. 1A;

FIG. 7B is a cross-sectional side view of the snap hook of FIG. 1A with the locking member in a disengaging position;

In accordance with common practice, the various described features are not drawn to scale but are drawn to emphasize specific features relevant to the present invention. Reference characters denote like elements throughout Figures and text.

DETAILED DESCRIPTION

Figure 2:
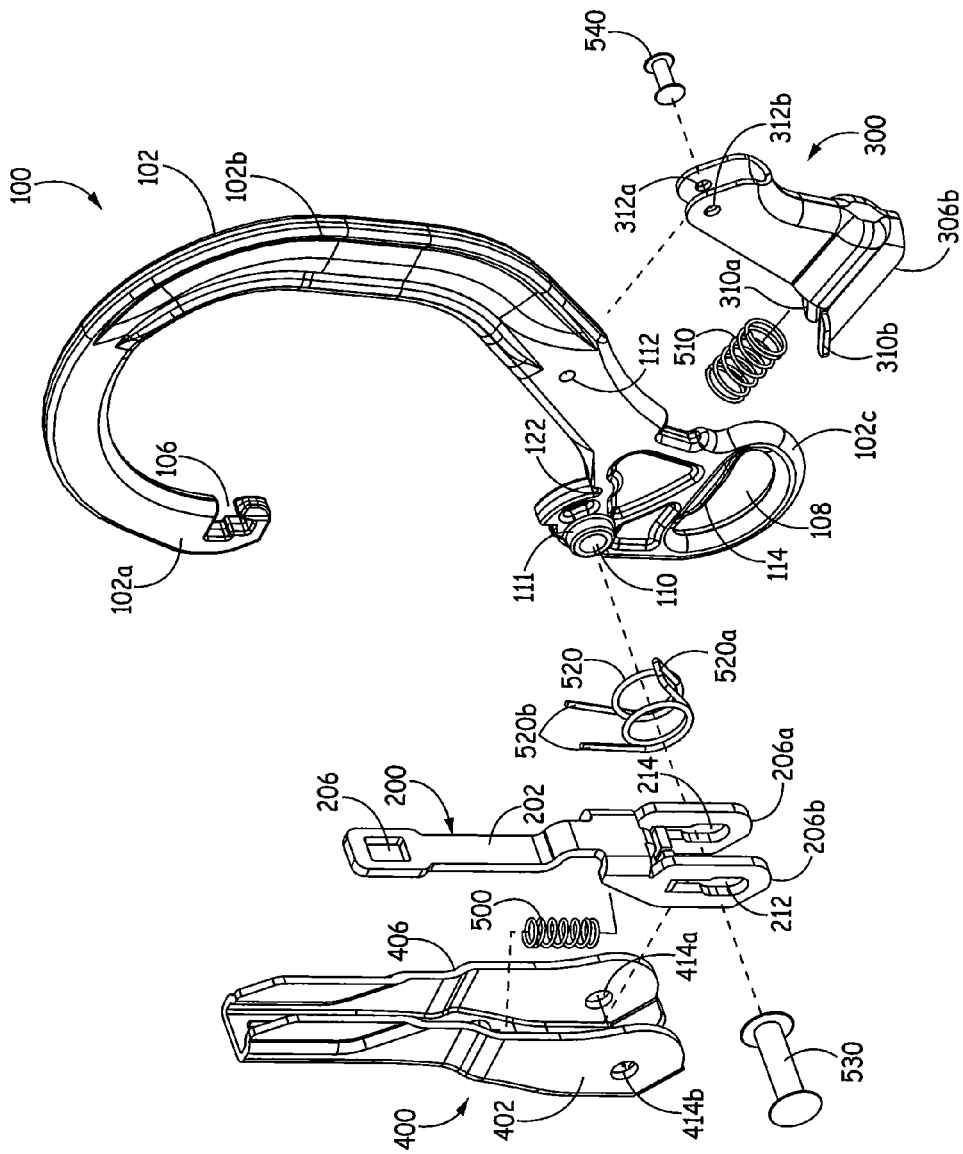
FIG. 2 is a side perspective exploded view of the snap hook of FIG. 1A.
Figure 4D:
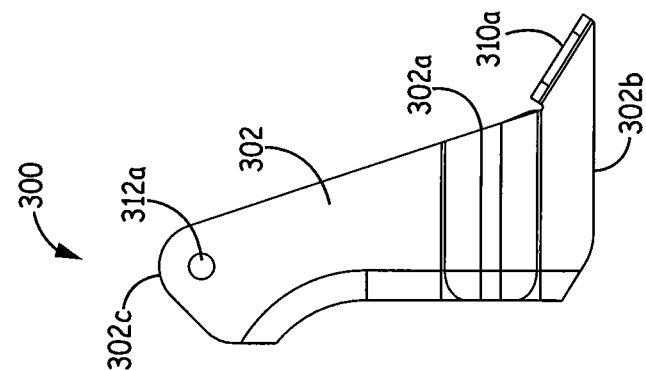
FIG. 4D is a second side view of the trigger of FIG. 4A.
Figure 4C:
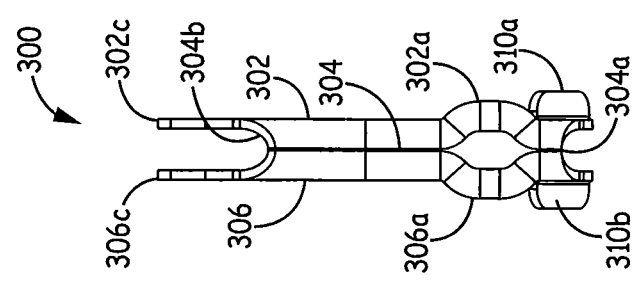
FIG. 4C is a back view of the trigger of FIG. 4A.
Figure 4B:
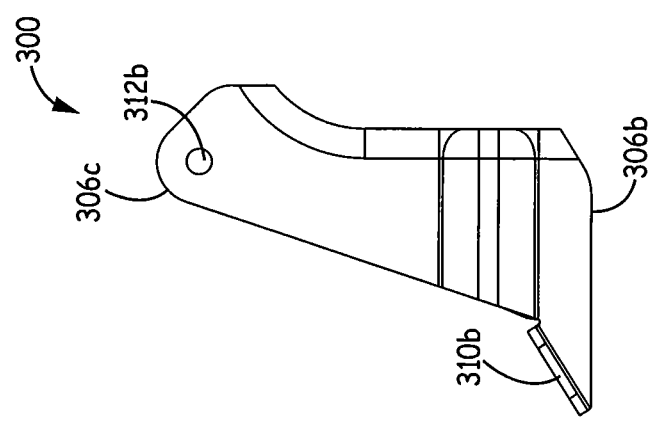
FIG. 4B is a first side view of the trigger of FIG. 4A.
Figure 4A:
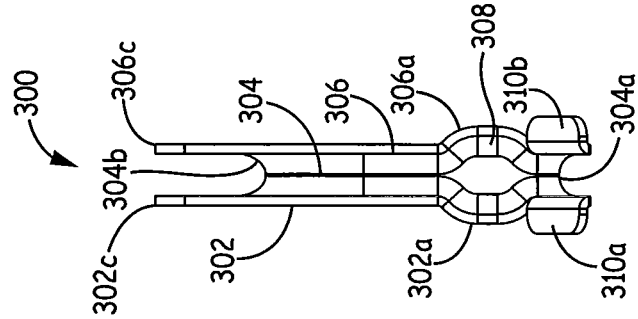
FIG. 4A is a front view of a trigger of the snap hook of FIG. 1A.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a connector that is easy to use. The connector could be a snap hook, a carabiner, or any other type of suitable connector. An example of a suitable connector that could be used with the present invention is a snap hook 100, which is a prior art snap hook disclosed in U.S. Pat. No. 8,752,254. The snap hook 100 is shown in FIGS. 1A-7B. Although snap hook 100 is shown and described herein as one type of connector, it is recognized that other suitable connectors could also be used with the present invention.

Referring to FIG. 1A, a side perspective view of the snap hook 100 is illustrated. Snap hook 100 includes a body 102, a gate 400, a locking member 200, and a trigger 300. FIG. 1A illustrates the snap hook 100 having its gate 400 in a closed configuration. The gate 400 in an open configuration is illustrated in FIG. 1B. The elements of the snap hook 100 are further illustrated in the exploded view of FIG. 2. Besides the body 102, the gate 400, the locking member 200 and the trigger 300, snap hook 100 further includes a locking bias member 500, a gate biasing member 520, a trigger biasing member 510, a gate retaining rivet 530 and a trigger retaining rivet 540.

The locking member 200 is illustrated in FIGS. 3A through 3D. The locking member includes a base 202 that has a first end 202a and a second end 202b. Extending from the first end 202a is a locking portion 204. In particular, a first portion 204a extends from the first end 202a of the base 202. Extending from the first portion 204a of the locking portion 204 are opposed side portions 204c and 204d. A holding portion 204b (holding tab) extends between the opposed side portions 204c and 204d. The first portion 204a, the side portions 204c and 204d and the holding portion 204b form a locking passage 206. The base 202 further includes a bend 202c as best seen in FIGS. 3B and 3D. The locking member 200 also includes a pair of legs 206a and 206b that extend generally perpendicular to the base 202 in an opposed fashion from the second end 202b of the base 202. Further extending from the second end 202b of the base 202 is a biasing member seat 208 designed to hold a first end of the locking biasing member 500 (as illustrated in FIGS. 7A and 7B). The biasing member seat 208 generally has a first portion that extends generally perpendicular from the base 202 and a second portion that extends generally parallel with the base 202 towards the first end 202a of the base 202. Each leg 206a and 206b further includes a respective lock stop tab 210a and 210b. Each tab 210a and 210b extends towards each other in generally a perpendicular fashion from a respective leg 206a and 206b proximate a mid portion of each respective leg 206a and 206b as illustrated in FIG. 3A and FIG. 3C. Referring to the first and second side views FIG. 3B and FIG. 3D, each leg 206a and 206b also includes a slot 212 and 214 respectively. Each slot 212 and 214 includes a first portion 212a and 214a that is generally rectangular in shape with rounded corners and a second portion 212b and 214b that extends from the first respective portion 212a and 214a that is generally rectangular in shape having a width that is less than the width of the first respective portions 212a and 214a. The slots 212 and 214 in the respective legs 206a and 206b are aligned with each other. Also illustrated in FIGS. 3B and 3D is that the respective legs 206b and 210b terminate in a rounded fashion with a respective flat portion 212c and 214c.

The trigger 300 is illustrated in FIGS. 4A through 4D. The trigger 300 includes a middle portion 304 and first and second side portions 302 and 306. The side portions 302 and 306 extend from respective side edges of the middle portion 304 in generally a perpendicular fashion. In FIGS. 4A through 4D, the side portions 302 and 306 are mirror images of each other having interior surfaces facing each other. Respective side edges of the middle portion 304 that form into the respective side portions 302 and 306 define a width of the middle portion 304. The middle portion further includes a first end 304a and an opposed second end 304b. The width of the middle portion 304 bulges out proximate the first end 304a of the middle portion 304 to form a trigger bias member seat 308. Correspondingly, the first side portion 302 and the second side portion 306 have curved portions 302a and 306a respectively that accommodate the bulge portion of the middle portion to form the trigger bias member seat 308. Each of the first and second side portions 302 and 306 have a length defined by respective first ends 302b and 306b and respective second ends 302c and 306c. As illustrated, the length of the first and second side portion 302 and 306 are greater than the length of the middle portion 304. Proximate the second ends 302c and 306c of the side portions 302 and 306 are aligned trigger pivot connection apertures 312a and 312b used to pivotally couple the trigger 300 to the body 102 as further discussed below. The first ends 302b and 306b of the respective first and second side portions 302 and 306 extend forward at an angle and terminate in engaging faces 310a and 310b respectively. The engaging faces 310a and 310b are configured to selectively engage and move the locking member 200 as further discussed below.

The gate 400 is shown in FIGS. 5A through 5D. Similar to the trigger 300 discussed above, the gate 400 includes a middle portion 404 and a pair of side portions 402 and 406. The side portions 402 and 406 extend from opposite edges of the middle portion 404 that define a width of the middle portion 404 in a perpendicular fashion such that inside surfaces of the side portions 402 and 406 face each other. The middle portion 404 includes a first end 404a and an opposed second end 404b that define the length of the middle portion 404. Proximate a mid-portion of the middle portion 404 is attached a gate biasing seat 411. The gate biasing seat 411 is designed to engage an end of a locking bias member 500 as further discussed below. The middle portion 404 further includes a gate passage 412 that is positioned proximate the second end 404b of the middle portion 404. A receiving portion 404c is formed between the gate passage 412 and the second end 404b of the gate 400. The receiving portion 404c is selectively received in the receiving slot 106 of the body 102 when the gate is in a closed position.

The side portions 402 and 406 of gate 400 generally mirror each other as shown in FIGS. 5A through 5D. Each side portion 402 and 406 includes three sections. The first side sections 402a and 406a respectively is positioned proximate the first end 404a of the middle portion 404. The third sections 402c and 406c respectively are positioned proximate the second end 404b of the middle section 404 while second sections 402b and 406b respectively of the side portions 402 and 406 are positioned between the first and third sections 402a, 406a and 402c, 406c of the respective side portions 402 and 406. Each side portion 402 and 406 includes a width that extends from the middle portion 404 to respective side edges 402d and 406d. The middle portion 404 and side portions 402 and 406 form a gate channel 405 in which the locking member 200 is slidably received. As illustrated in FIG. 5A, a width of channel 405 is formed by middle portion 404, sections 402a, 402b and 402c of side portion 402 and sections 406a, 406b and 406c of side portion 406 is varied to accommodate the shape of the locking member 200 received in the channel 405. Moreover, the width of the channel 405 is narrowed less than a width of a corresponding portion of the locking member 200 by the third sections 402c and 406c bending in towards each other proximate the side edges 402d and 406d. This arrangement retains the locking member 200 within the channel 405 even when the gate 400 is in the open configuration.

Proximate the first end of the middle portion 404, each side portion 402 and 406 of the gate 400 has a tab 408a and 408b respectively that extends generally perpendicular from the respective side portions 402 and 406 towards each other. The tabs 408a and 408b form a gate slot 410 between each other. The slot 410 receives a portion of the connection portion 102c of the body 102. Also proximate the tabs 408a and 408b and in the first section 402a and 406a of the respective side portions 402 and 406 are aligned gate pivot connection passages 414a and 414b that are used to pivotally couple the gate 400 to the connection portion 102c of the body as further discussed below.

Figure 6A:
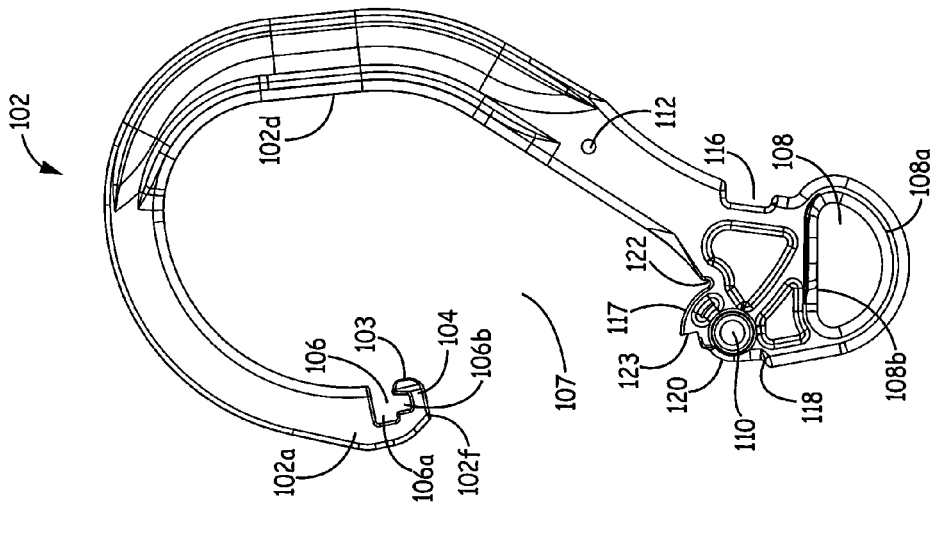
FIG. 6A is a first side view of a body of the snap hook of FIG. 1A.
Figure 6B:
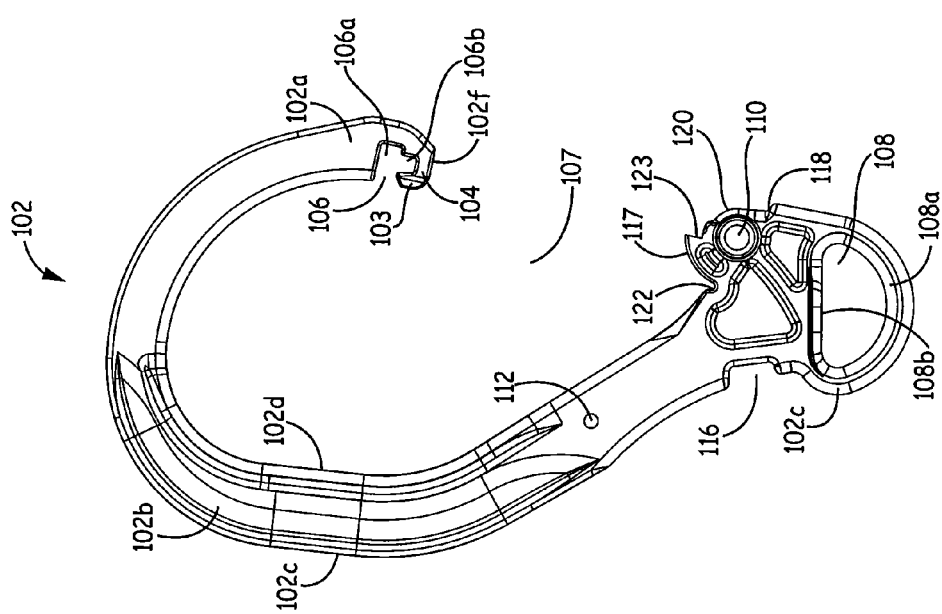
FIG. 6B is a second side view of the body of FIG. 6A.

The body 102 is further described in view of FIGS. 6A and 6B. As discussed above the body 102 includes a mid portion 102b that is generally in a hook shaped configuration. Extending from one end of the mid portion 102b is a nose portion 102a and extending from the other end of the mid portion 102b is the connecting portion 102c. The body 102 includes an outer side edge 102e an inner side edge 102d. The nose portion 102a terminates in a nose end 102f. The nose portion 102a further includes a slot 106 that includes a receiving slot 106a that extends into the body 102 from the inner side edge 102d of the body 102 in generally a perpendicular fashion in relation to the nose end 102f. The slot 106 further includes a holding slot 106b that extends from the receiving slot 106a towards the nose end 102f in a generally perpendicular fashion in relation to the receiving slot 106a. The receiving slot 106a and the holding slot 106b form a hook portion 104 having a catch 103 in the nose portion 102a of the body 102. The body 102 further includes an opening 107 to the inner surface of the body 102 that is positioned between the nose end 102f and the connection portion 102c. The opening 107 is selectively closed when the gate 400 is in the closed configuration. The mid portion 102b of the body 102 includes a trigger pivot connection aperture 112 that is generally positioned proximate the connection portion 102c.

The connection portion 102c of the body 102 extends from an end of the mid portion 102b of the body 102. The connection portion 102c includes a connection passage 108 which allows a strap, webbing, connector, or the like, to be coupled to the body 102. The connection passage 108 is semi-circular (half-circular) having an arc portion 108a and a straight portion 108b. The arc portion 108a is used to connect the webbing. In this embodiment, the webbing (not shown) is tightly sewn about the arc portion 108a of the connection passage 108 so that a rotation of the webbing is limited proximately 180 degrees. This configuration reduces the possibility of the webbing rotating up into the locking mechanism causing an unintentional opening of the snap hook 100.

Along the outer side edge 102e of the body 102, proximate the connection portion 102c, is a notch 116 that forms a biasing trigger seat for a trigger biasing member 510 further discussed below. Proximate the opening 107 to the inner side 102d of the body 102, the connection portion includes a gate pivot connection aperture 110. Also proximate the opening 107 is a radially extending surface 117 that radially extends at least partially around the gate pivot connection aperture 110. Proximate a juncture between the inner side 102d of the body 102 and the radially extending surface 117 is formed a gate biasing notch 122 used to hold a gate biasing member 520 in place. The radially extending surface 117 of the connection portion further includes a radial cut out connection portion 120 that forms a locking member stop 123 at one end and a gate stop 118 at another end. A hub 111 extends outward about the gate pivot connection aperture 110 to retain the gate biasing member 520 in place as further discussed below. One other feature of the connection portion 102c of the body 102 is a trigger stop ledge 114 (shown in FIGS. 1B and 2) that extends out from both sides of the body 102 proximate a portion of the connection passage 108. The trigger stop ledge 114 holds the trigger 300 in place when not activated as further discussed below.

Referring to the cross-sectional views illustrated in FIGS. 7A and 7B, as well as the exploded view of FIG. 2, further description of the assembly of the snap hook 100 is provided. The trigger 300 is pivotally attached to the body 102 via a trigger retaining rivet 540 that is passed through the trigger pivot connection apertures 312a and 312b of the trigger 300 and the trigger pivot connection aperture 112 in the body 102. The trigger biasing member 510 is positioned between the biasing trigger notch seat 116 in the body 102 and the trigger bias member seat 308 formed in the trigger 300. The trigger bias member 510 biases the trigger to an un-activation position. The trigger stop ledges 114 on the connection portion 102c of the body 102 keep the trigger 300 from rotating beyond a desired location in relation to the body 102 when in the un-activation position by engaging the respective first ends 302b and 306b of side portions 302 and 306 of the trigger 300. When the trigger 300 is in the un-activation position, no force is being asserted on the locking member 200 to counter the biasing force of the locking bias member 500. Hence, when the trigger 300 is in the un-activation position, the holding portion 204*b* (tab) of the locking member 200 is held in the holding slot portion 106*b* (second slot portion) of the slot 106 in the nose portion 102*a* of the main body 102 by catch 103. In FIG. 7B, trigger 300 has been depressed and is in an activation position. In the activation position, the trigger 300 asserts a force on the locking member 200 that counters the locking biasing member 500 which allows the locking member 200 to move up in relation to the main body 102 such that the holding portion 204*b* of the locking member 200 clears the catch 103 and the lock stop tabs 210*a* and 210*b* of the locking member 200 clear the locking member stop 123 as discussed further below. With the locking member 200 in this position, the gate 400 can be pushed in countering the gate biasing member 520 to place the snap hook 100 in the open configuration.

Also illustrated in FIG. 7A is the lock stop tab 210*a* that is positioned in the cutout connection portion 120 adjacent the locking member stop 123 of connection portion 102*c* of the body 102. This is the position of the lock stop tabs 210*a* and 210*b* of the locking member 200 when the holding portion 204*b* of the locking member 200 is locked in the receiving slot 106*b* of the nose portion 102*a* of the body 102. The lock stop tabs 210*a* and 210*b*, engaging the locking member stop 123, provide another locking mechanism to prevent the gate 400 from unintentionally opening. Referring to FIG. 7B where the trigger 300 has been depressed, therein sliding the locking member 200 up in the gate 400, it is illustrated that the lock stop tab 210*a* of the locking member 200 has cleared the locking member stop 123 of the connection portion 102*c* of the body 102 and the holding portion 204*b* of the locking member 200 has cleared the catch 103 of the body 102. The gate 400 can then be opened. In the open configuration, the lock stop tabs 210*a* and 210*b* ride on the radially extending surface 117 therein keeping the locking member 200 up in an unlocking position in relation to the gate 400. Only after the gate 400 is repositioned in the closed position (or configuration) with the receiving portion 404*c* of the gate 400 positioned proximate an interior surface in the receiving slot 106*a* of the nose portion 102*a* of the body 102, does the lock stop tabs 210*a* and 210*b* slide down into the cutout connection portion 120 proximate the locking member stop 123 of the connection portion 102*c* of the body 102 via a biasing force provided by the locking bias member 500. This configuration prevents any false conveyance that the gate 400 is locked until it is properly positioned within the receiving slot 106*a* of the nose portion 102*a* of the body. Referring to FIG. 3A through 3D, the lock stop tabs 210*a* and 210*b* are illustrated as being formed by cutting and bending (punched out) connection slots 212*b* and 214*b* of the respective legs 206*a* and 206*b* of the locking member 200. That is just one method of making the lock stop tabs 210*a* and 210*b*. In another embodiment, respective aligned passages are placed in the legs 206*a* and 206*b* of the locking member 200 with a through rivet pin passing there through. In this embodiment, the rivet pin acts as the lock stop tabs 212*a* and 212*a*. In still yet another embodiment, a holding bar could be used instead of the lock stop tabs 210*a* and 210*b*.

Figure 8:
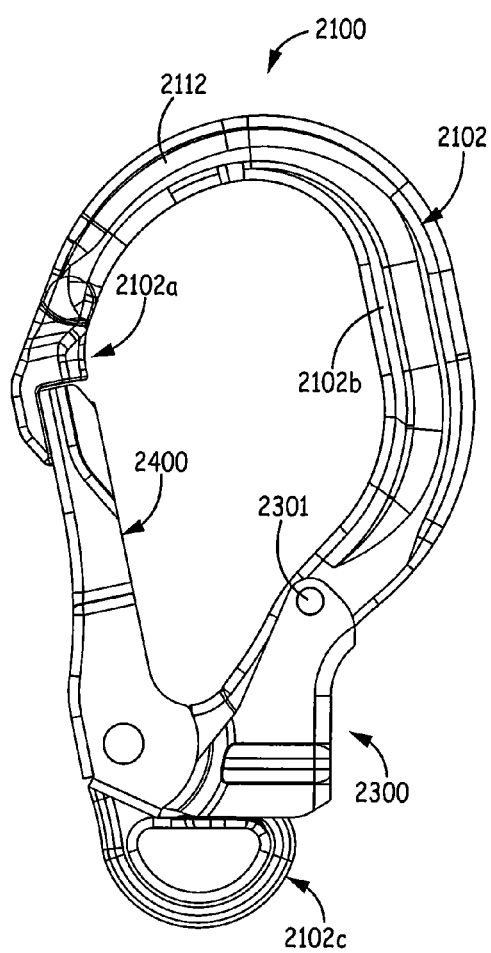
FIG. 8 is a side view of an embodiment of a snap hook constructed in accordance with the principles of the present invention.
Figure 9:
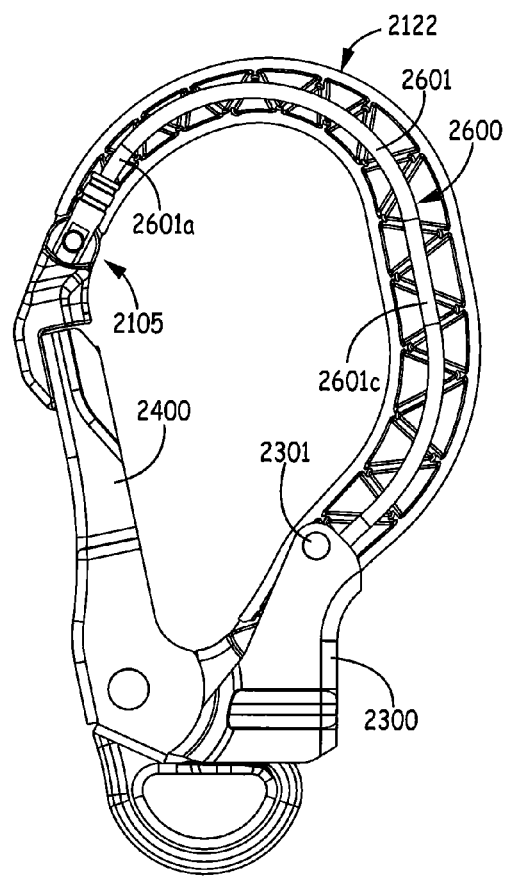
FIG. 9 is a side view of the snap hook shown in FIG. 8 with a first portion of a body removed.
Figure 10:
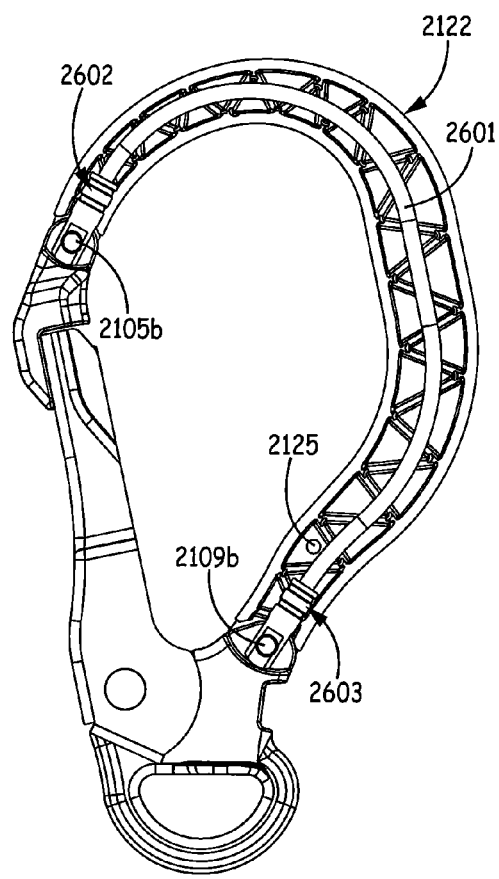
FIG. 10 is a side view of the snap hook shown in FIG. 8 with a first portion of a body removed and a trigger removed.
Figure 11:
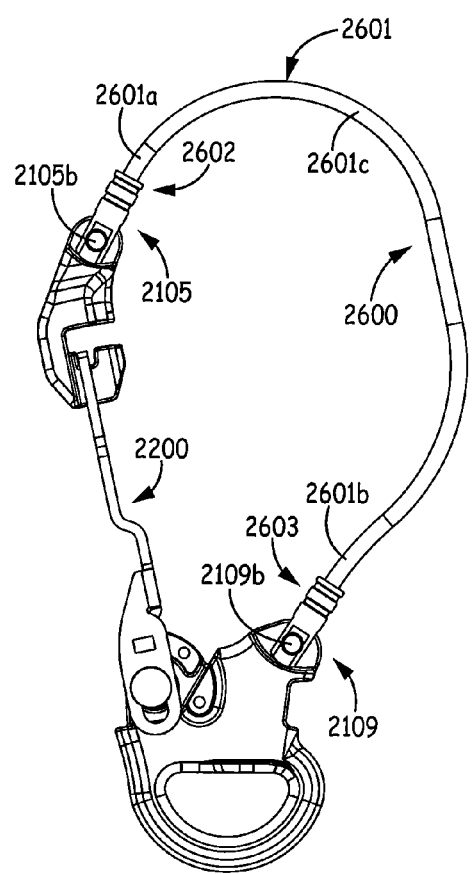
FIG. 11 is a side view of the snap hook shown in FIG. 8 with a body removed, a trigger removed, and a gate removed.

Referring to FIG. 8, an embodiment snap hook 2100 incorporating the present invention is illustrated. Snap hook 2100 is similar to the snap hook 100 and, therefore, only the components that are not substantially similar will be described.

The snap hook 2100 includes a different configuration body 2102, which in one embodiment includes separate components operatively connected to form the body 2102, and a flexible strength member 2600. The body 2102 includes a nose portion 2102*a*, a mid portion 2102*b*, and a connecting portion 2102*c*. The mid portion 2102*b* is shown having a first portion 2112 and a second portion 2122. The flexible strength member 2600 interconnects the nose portion 2102*a* and the connecting portion 2102*c* and extends through the mid portion 2102*b*. A gate 2400 including a locking member 2200 interconnects the connecting portion 2102*c* and the nose portion 2102*a*, and a trigger 2300 interconnects the body 2102 and the locking member 2200 similar to the snap hook 100.

The nose portion 2102*a* includes a first connector 2105, which is a flange-like portion extending outward from the nose portion 2102*a*. The first connector 2105 includes an aperture (not shown). The connecting portion 2102*c* includes a second connector 2109, which is a flange-like portion extending outward from the connecting portion 2102*c*. The second connector 2109 includes an aperture (not shown).

Figure 12:
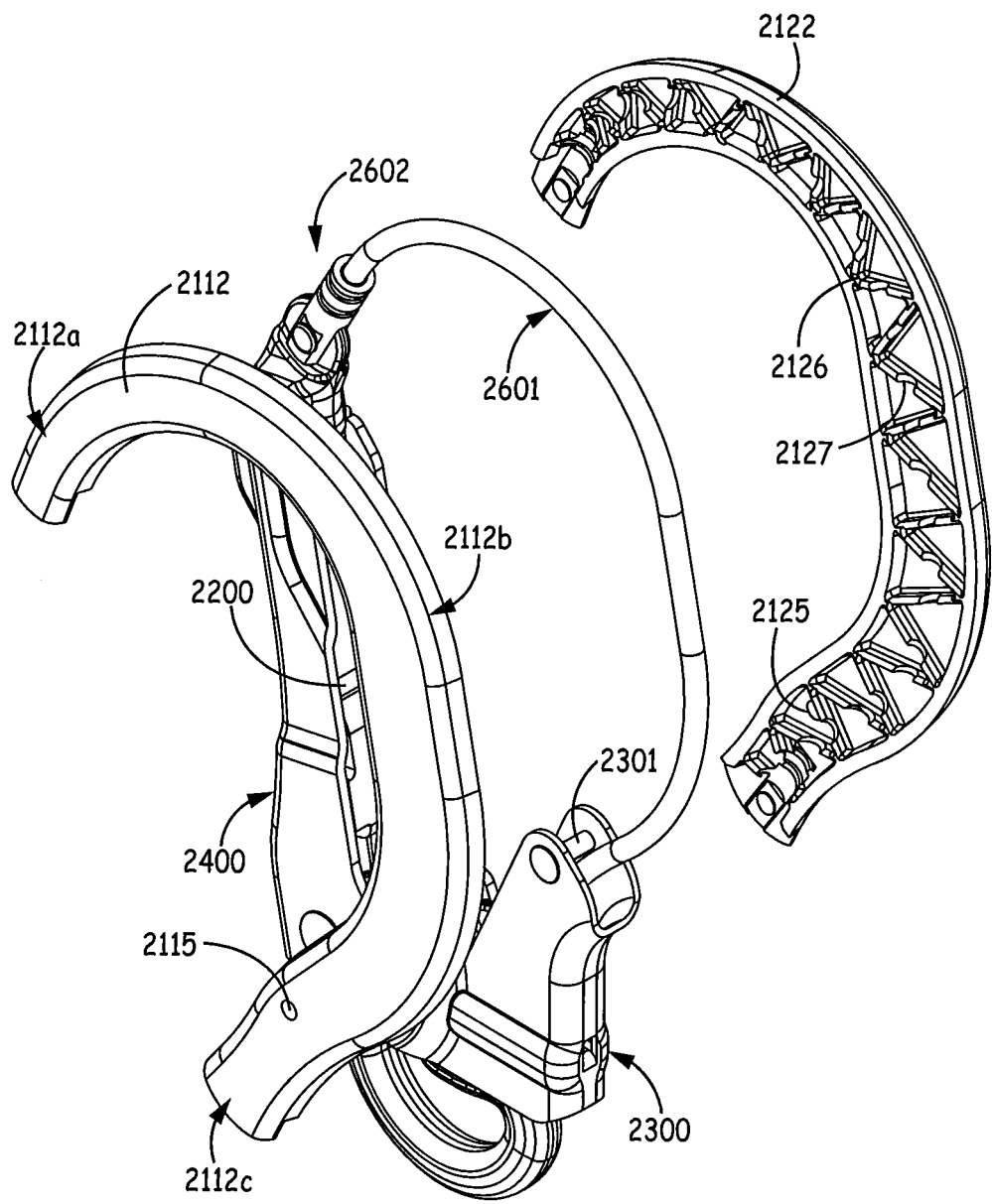
FIG. 12 is a partially exploded perspective view of the snap hook shown in FIG. 8.
Figure 14:
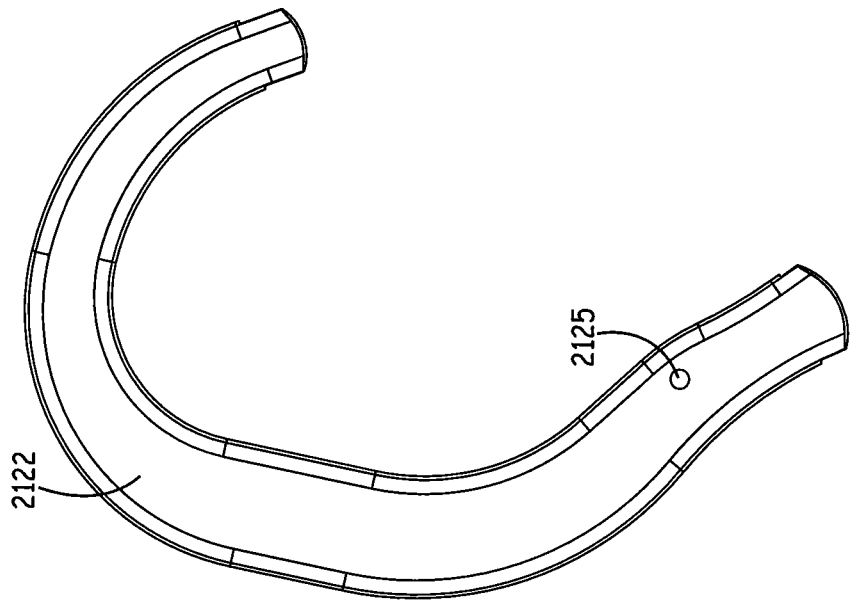
FIG. 14 is an outer side view of a second portion of the body of the snap hook shown in FIG. 8.
Figure 13:
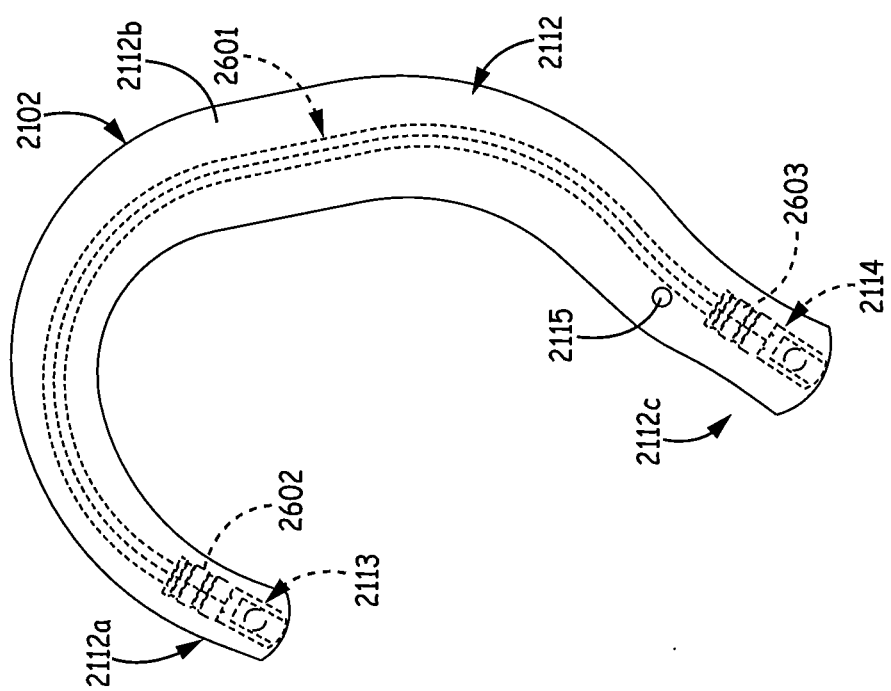
FIG. 13 is a side view of a body of the snap hook shown in FIG. 8.
Figure 15:
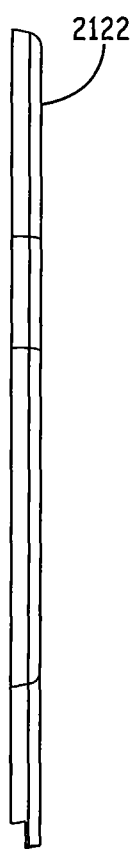
FIG. 15 is a rear view of the second portion shown in FIG. 14.
Figure 16:
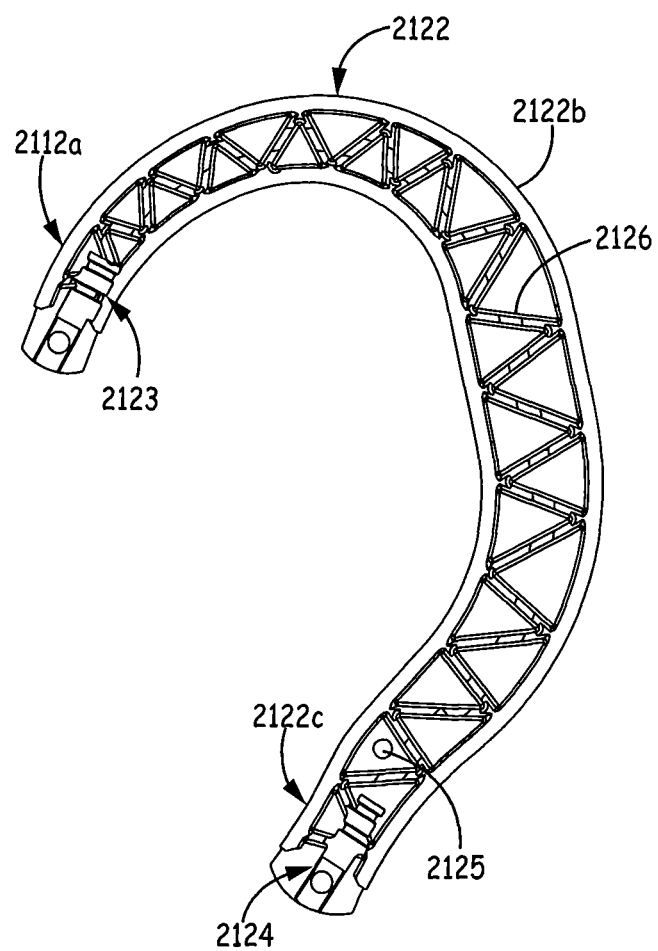
FIG. 16 is an inner side view of the second portion shown in FIG. 14.

The first portion 2112 and the second portion 2122 of the mid portion 2102*b* are preferably halves that are mirror images. Although two halves are shown, it is recognized that the mid portion 2102*b* could also be over-molded as a single piece or more than two pieces could form the mid portion 2102*b*. Any configuration that provides adequate structure during normal use could be used. The first portion 2112 includes an end 2112*a* proximate the nose portion 2102*a* having a receiving cavity 2113, a mid portion 2112*b*, and an end 2112*c* proximate the connecting portion 2102*c* having a receiving cavity 2114. The mid portion 2112*b* includes an aperture 2115 proximate the end 2112*c*. Similarly, the second portion 2122 includes an end 2122*a* proximate the nose portion 2102*a* having a receiving cavity 2123, a mid portion 2122*b*, and an end 2122*c* proximate the connecting portion 2102*c* having a receiving cavity 2124. The mid portion 2122*b* includes an aperture 2125 proximate the connecting portion 2102*c*. As shown in FIG. 12, the second portion 2122 is generally hollow with a plurality of reinforcing members 2126 zigzagging from side to side, and the reinforcing members 2126 include notches 2127. Although not shown, the first portion 2112 includes similar reinforcing members and notches. The reinforcing members 2126 and the notches 2127 are optional. The reinforcing members add strength to the mid portion 2102*b* and allow less material to be used thereby reducing the weight of the body, and the notches align to provide a channel through which the elongate member extends. A rivet 2301 extends through apertures (not shown) in the trigger 2300 and the apertures 2115 and 2125 of the first and second portions 2112 and 2122 forming the mid portion 2102*b* of the body 2102.

Figure 17:
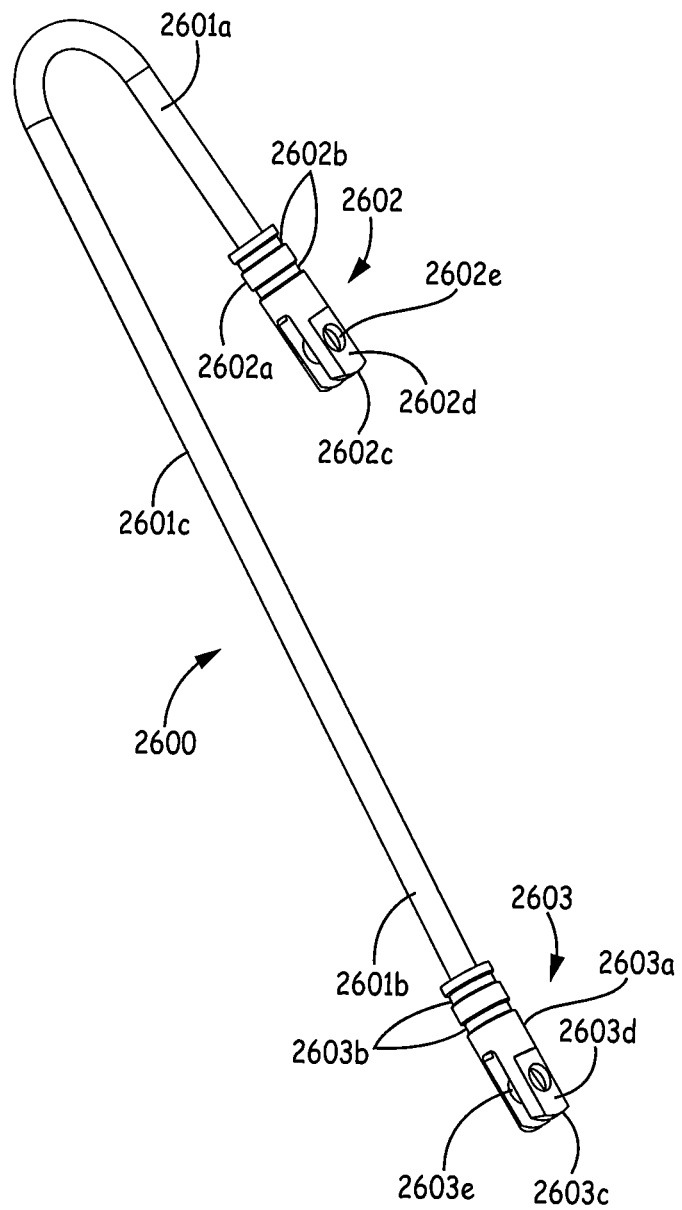
FIG. 17 is a perspective view of a flexible strength member of the snap hook shown in FIG. 8.

The flexible strength member 2600, shown in FIG. 17, includes an elongate member 2601 having an intermediate portion 2601*c* interconnecting a first end 2601*a* and a second end 2601*b*. The elongate member 2601 could be made of any suitable material such as but not limited to a steel cable, a high strength synthetic fiber rope, a webbing, etc. A first stop 2602 is operatively connected to the first end 2601*a*, preferably by crimping, soldering, or other suitable means, and a second stop 2603 is operatively connected to the second end 2601*b*, also preferably by crimping, soldering, or other suitable means. The first stop 2602 includes a base 2602*a* having detents 2602*b* proximate the end receiving the first end 2601*a* of the elongate member 2601. Although not shown, it is recognized that the base 2602*a* includes a cavity or a bore configured and arranged to receive the first end 2601a of the elongate member 2601. A forked portion 2602c extends outward from the base 2602a, and the side of each forked portion 2602c includes a recessed portion 2602d having an aperture 2602e. The second stop 2603 includes a base 2603a having detents 2603b proximate the end receiving the second end 2601b of the elongate member 2601. Although not shown, it is recognized that the base 2603a includes a cavity or a bore configured and arranged to receive the second end 2601b of the elongate member 2601. A forked portion 2603c extends outward from the base 2603a, and the side of each forked portion 2603c includes a recessed portion 2603d having an aperture 2603e.

It is recognized that if the elongate member 2601 is made of webbing or rope, a stitch pattern, a loop, or any other suitable connector could be used as a stop at each end.

The forked portion 2602c of the first stop 2602 includes two portions with a gap therebetween, and the first connector 2105 is received within the gap. The apertures in the forked portion 2602c and in the first connector align, and a rivet 2105b extends therethrough. Similarly, the forked portion 2603c of the second stop 2603 includes two portions with a gap therebetween, and the second connector 2109 is received within the gap. The apertures in the forked portion 2603c and in the first connector align, and a rivet 2109b extends therethrough. The rivets 2105b and 2109b allow the stops 2602 and 2603 to pivot relative to the connectors 2105 and 2109, respectively.

It is recognized that there are many suitable materials and configurations that could be used for the flexible strength member and the connection to the connector. Therefore, the present invention is the general concept of forming a closed loop arrangement with a flexible strength member forming a portion of the connector.

In use, the snap hook 2100 functions much like the snap hook 100, but when a fall occurs, the mid portion 2102b may deform (e.g., change shape, break, break away, or otherwise fail) when subjected to a force, and the flexible strength member 2600 ensures the snap hook 2100 does not fail. For example, in one embodiment, the second end of the gate is configured and arranged to be selectively locked relative to the nose portion thereby forming a locked, closed loop arrangement with the nose portion, the flexible strength member, and the connecting portion.

Although the flexible strength member is shown in use with a snap hook, it is recognized that it could be used with any suitable type of connector, such as but not limited to a snap hook and a carabiner. Further, it is recognized that the present invention may be used with any suitable configuration for a snap hook and is not limited to the configuration shown, for example, in FIGS. 1-7B. It is preferable that the connector be of the locking type such that the gate or the locking member locks to the nose.

The flexible strength member is incorporated into a connector assembly so that the assembly functions in a similar manner to traditional connectors during normal use but functions like a flexible loop during fall arrest situations. The flexible strength member could be molded into the connector body or positioned between two halves of a connector body. During a fall arrest scenario, the overmolded portion or portions of the connector body could deform without compromising the connection integrity. The flexible strength member could be incorporated into small or large connectors as its strength is not related to gate opening size or hook size. The gate portion of the connector is preferably connected to the hook nose via a lock mechanism.

Although a traditional locking-nose connector is shown, it is recognized that any suitable type of nose/gate locking mechanism could be used to ensure the gate does not separate from the nose when the flexible strength member is in use.

It is also recognized that the body portion may be overmolded, at least two portions operatively connected (by an adhesive, soldering, or any other suitable manner), or any other suitable mechanism providing adequate structure during normal use. Further, the body portion could be made of metal, plastic, composite materials (e.g., fiberglass, carbon fiber, etc., which could be used in multi-layer design to reduce weight) or any other suitable material providing adequate structure during normal use.

Further, a locking member could be operatively connected to the nose portion and be configured and arranged to selectively couple the nose portion to the gate. In other words, the locking member is operatively connected to the nose portion, rather than to the gate, and locks onto the gate, rather than onto the nose portion.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is manifestly intended that this invention be limited only by the claims and the equivalents thereof.

The invention claimed is:

1. A connector, comprising:
   a body having a mid portion positioned between a nose portion and a connecting portion, the nose portion terminating in a nose end, the body further having an opening positioned between the nose end and the connecting portion, the mid portion having a flexible strength member extending therethrough interconnecting the nose portion and the connecting portion, the flexible strength member including a first stop connected to the nose portion, a second stop connected to the connecting portion, and an elongate member interconnecting the first and second stops and extending through the mid portion; and
   a gate having a first end coupled proximate the connecting portion of the body and a second end configured and arranged to engage the nose portion of the body to selectively close the opening, wherein the gate has a closed position when positioned across the opening and an open position when the opening is at least partially unobstructed by the gate.

2. The connector of claim 1, wherein the second end of the gate is configured and arranged to be selectively locked relative to the nose portion thereby forming a locked, closed loop arrangement with the nose portion, the flexible strength member, and the connecting portion.

3. The connector of claim 1, further comprising:
   the nose portion including a slot;
   a locking member operatively connected to the gate, the locking member having a first end configured and arranged to be selectively received in the slot in the nose portion of the body to selectively couple the gate to the nose portion of the body; and
   a trigger having a first end pivotally coupled to the body, the trigger having a second end configured and arranged to engage a second end of the locking member to disengage the first end of the locking member from the slot of the nose portion of the body.

4. The connector of claim 3, further comprising:
- a gate biasing member configured and arranged to bias the gate in the closed position in relation to the body;
- a locking biasing member configured and arranged to bias the locking member to selectively couple the gate to the nose portion of the body when the gate is in the closed position; and
- a trigger biasing member configured and arranged to bias the second end of the trigger away from the second end of the locking member.

5. The connector of claim 1, wherein the mid portion is made from a material selected from the group consisting of metal, plastic, and a composite material selected from the group consisting of fiberglass and carbon fiber.

6. The connector of claim 1, wherein the mid portion is over-molded.

7. The connector of claim 1, wherein the mid portion is at least two components.

8. The connector of claim 1, wherein the mid portion is configured and arranged to deform when subjected to a force.

9. The connector of claim 1, wherein the elongate member is made from a material selected from the group consisting of steel cable, high strength synthetic fiber rope, and webbing.

10. The connector of claim 1, wherein the first and second stops are pivotally connected to the respective nose portion and connecting portion.

11. The connector of claim 1, further comprising a locking member operatively connected to the nose portion and configured and arranged to selectively couple the nose portion to the gate.

12. A connector, comprising:
- a body having a mid portion positioned between a nose portion and a connecting portion, the nose portion terminating in a nose end, the body further having an opening positioned between the nose end and the connecting portion, the mid portion having a flexible strength member extending therethrough interconnecting the nose portion and the connecting portion, the flexible strength member including a first stop connected to the nose portion, a second stop connected to the connecting portion, and en elongate member interconnecting the first and second stops and extending through the mid portion, the first and second stops being pivotally connected to the respective nose portion and connecting portion;
- a gate having a first end coupled proximate the connecting portion of the body and a second end configured and arranged to engage the nose portion of the body to selectively close the opening, wherein the gate has a closed position when positioned across the opening and an open position when the opening is at least partially unobstructed by the gate; and
- a locking member interconnecting the nose portion and the second end of the gate to form a locked, closed loop arrangement with the nose portion, the flexible strength member, and the connecting portion.

13. The connector of claim 12, wherein the locking member is operatively connected to the gate and is configured and arranged to selectively lock relative to the nose portion.

14. The connector of claim 12, wherein the mid portion is made from a material selected from the group consisting of metal, plastic, and a composite material selected from the group consisting of fiberglass and carbon fiber.

15. The connector of claim 12, wherein the mid portion is over-molded.

16. The connector of claim 12, wherein the mid portion is at least two components.

17. The connector of claim 12, wherein the mid portion is configured and arranged to deform when subjected to a force.

18. The connector of claim 12, wherein the elongate member is made from a material selected from the group consisting of steel cable, high strength synthetic fiber rope, and webbing.

* * * * *

UNITED STATES PATENT AND TRADEMARK OFFICE
CERTIFICATE OF CORRECTION

PATENT NO. : 9,861,839 B2  
APPLICATION NO. : 14/621623  
DATED : January 9, 2018  
INVENTOR(S) : Judd James Perner Page 1 of 1

It is certified that error appears in the above-identified patent and that said Letters Patent is hereby corrected as shown below:

<u>Column 12</u>  
Line 4, in Claim 12, delete "en" and insert -- an --, therefor.

Signed and Sealed this  
Twelfth Day of June, 2018

Andrei Iancu  
*Director of the United States Patent and Trademark Office*